United States Patent
BuAbbud et al.

(10) Patent No.: US 7,286,769 B1
(45) Date of Patent: Oct. 23, 2007

(54) BIDIRECTIONAL FREQUENCY SHIFT CODING USING TWO DIFFERENT CODES FOR UPSTREAM AND DOWNSTREAM

(75) Inventors: George H. BuAbbud, South Lake, TX (US); Muneer Zuhdi, Lewisville, TX (US)

(73) Assignee: Tellabs Bedford, Inc., Bedford, TX (US)

( * ) Notice: Subject to any disclaimer, the term of this patent is extended or adjusted under 35 U.S.C. 154(b) by 857 days.

(21) Appl. No.: 09/540,955

(22) Filed: Mar. 31, 2000

(51) Int. Cl.
*H04B 10/00* (2006.01)

(52) U.S. Cl. .................................................. 398/155

(58) Field of Classification Search ............... 359/137, 359/113, 123; 398/41, 66, 67, 100, 168, 398/99, 154, 155
See application file for complete search history.

(56) References Cited

U.S. PATENT DOCUMENTS 5,459,607 A * 10/1995 Fellows et al. ............. 398/154
5,491,575 A * 2/1996 Neidlinger et al. ......... 359/137
5,719,904 A * 2/1998 Kim ........................... 375/340
5,896,211 A * 4/1999 Watanabe .................... 359/124

FOREIGN PATENT DOCUMENTS

EP 482943 4/1992
EP 917314 5/1999

OTHER PUBLICATIONS

K. Kaede et al. "A Passive Double Star Optical Subscriber System with Frequency Division Duplex Transmission and Flexible Access", IEICE Trans. Communication vol. E75-B No. 9, Sep. 1992.*

* cited by examiner

*Primary Examiner*—Shi K Li
(74) *Attorney, Agent, or Firm*—Baker Botts L.L.P.

(57) ABSTRACT

A method of transmitting bidirectional telephony communication signals on a single optical fiber. The bidirectional signals are transmitted in one direction as NRZ coded signals at a first clocking pulse rate, and in the other direction as Manchester coded signals at a second clocking pulse rate which is a multiple (preferably three times (3×)) of the first clocking pulse rate.

16 Claims, 5 Drawing Sheets

BIDIRECTIONAL FREQUENCY SHIFT CODING USING TWO DIFFERENT CODES FOR UPSTREAM AND DOWNSTREAM

BACKGROUND OF THE INVENTION

1. Field of the Invention

The present invention relates generally to methods and apparatus for carrying on simultaneous and unrelated transmissions over a single optical fiber. For example, TV signals may be transmitted downstream at 1550 nanometers of light and telephony signals may be transmitted bidirectionally 1310 nanometers of light. More specifically the invention relates to methods and apparatus for use with bidirectional telephony communications using two different codes such as NRZ (non-return to zero) coding and Manchester coding for upstream and downstream transmissions.

2. Description of Related Art Including Information Disclosed Under 37 CFR 1.97 and 1.98

The communications industry is using more and more optical or light fibers in lieu of copper wire. Optical fibers have an extremely high bandwidth thereby allowing significantly more information than can be carried by a copper wire transmission line such as twisted pairs or coaxial cable.

Of course, modern telephone systems require bidirectional communications where each station or user on a communication channel can both transmit and receive. This is true, of course, whether using electrical wiring or optical fibers as the transmission medium. Early telephone communication systems solved this need by simply providing separate copper wires for carrying the communications in each direction, and this approach may still be used in part of the transmission path. It is used to a greater degree as the signals get closer to the home or business end users. Although twisted pairs and coaxial cables are used in homes and distribution terminals close to the end user, some modern telecommunication systems now use micro-wave and optic fibers as transmission mediums. In addition various techniques are often used in optical transmission so that a signal optical fiber can carry communications in both direction.

However, because of extremely high band widths available for use by an optical fiber, a single fiber is quite capable of carrying a great number of communications in both directions. One technique of optical transmission is WDM (wavelength divisional multiplexing) which uses different wavelengths for different types of transmissions. Typical examples are the use of 1550 nanometers of light for TV signals transmission and 1310 nanometers of light for bidirectional telephony transmission.

It is noted that the term telephony is used rather than telephone to underscore the fact that communication transmission will include vocal telephone use but is not so limited. Typical telephony systems operate at a single frequency or wavelength of light which is divided into upstream and downstream carefully synchronized time windows. Telephony systems may use a single optical fiber and often even a single diode, for both converting electrical signals to optical signals and converting received optical signals to electrical signals.

However, as mentioned above, optical fibers have extremely high band widths and use of an optical fiber for a single telephone channel is a very ineffective use of the fiber and, in fact, the available bandwidth of an optical fiber is what makes it possible to use two different transmission techniques such as bidirectional telephone techniques at one frequency and another technique at a second frequency. Typically, two frequencies regardless of the two techniques being used are combined by the use of WDM technology.

A major problem for the bidirectional telephony signals is light reflection typically occurring at optical connections or interfaces along the optical fiber, and in a worse case situation, the reflected energy may be intercepted as an actual signal transmission in the bidirectional communication. Therefore, a technique for transmitting bidirectional telephony signals having minimal energy overlap and at difference frequencies would make efficient and effective use of an optical fiber.

SUMMARY OF THE INVENTION

Shortcomings of the above-discussed bidirectional communication system are overcome by the apparatus and methods of the present invention which comprises transmitting a first NRZ data stream having a first clocking frequency by an optical fiber from a first location to a second location. The data stream is transmitted by using a carrier having a selected wavelength of light such as, for example, 1310 nanometers. The selected wavelength of light from the first location is received at the second location and the NRZ data stream is recovered. A second NRZ data stream intended for travel to the first location and also having the first clocking frequency is received at the second location from a third location. The second NRZ data stream is converted to a Manchester coded data stream at a second clocking frequency which is a selected multiple of the first clocking frequency. The selected multiple should be two times (2×) or greater, and is preferably three times (3×) the first clocking frequency. The Manchester coded data stream from the second location is transmitted to the first location by the same optical fiber used by the NRZ transmission and at the same selected wavelength of light. The Manchester coded data stream is then received at the first location where it is converted back to an NRZ data stream having the first clocking frequency.

BRIEF DESCRIPTION OF THE DRAWINGS

These and other features of the present invention will be more fully disclosed when taken in conjunction with the following Detailed Description of the Preferred Embodiment(s) in which like numerals represent like elements and in which.

DETAILED DESCRIPTION OF THE PREFERRED EMBODIMENT(S)

Figure 1:
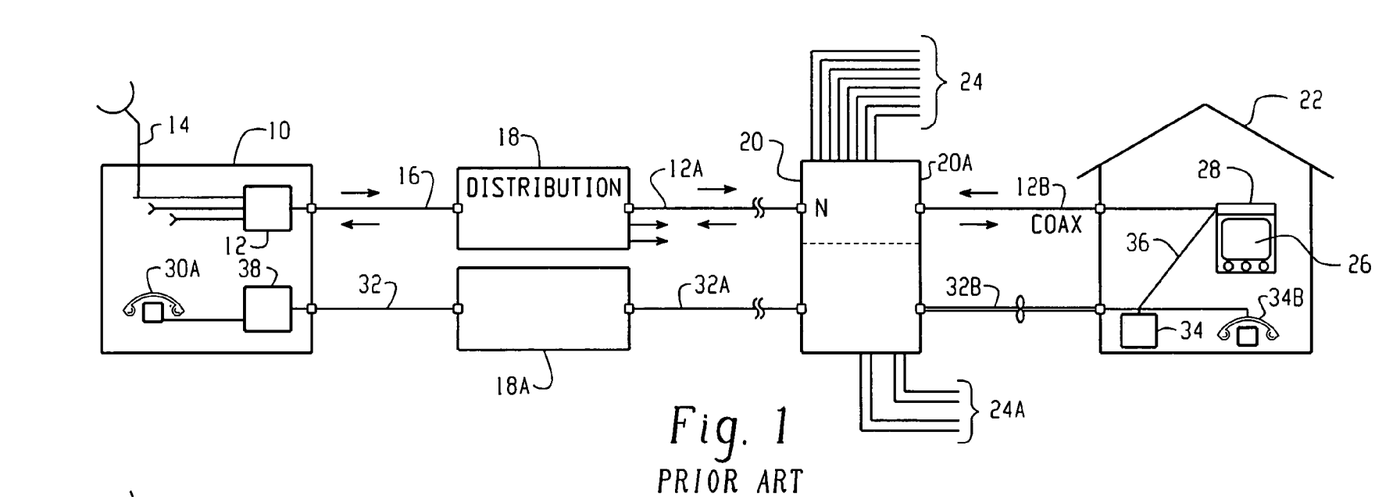
FIG. 1 is a prior art block diagram showing the present transmission and distribution of a typical coaxial TV and POTS telephone system.

Referring now to FIG. 1, there is shown a typical transmission and distribution system for cable TV and normal telephone service, referred to as POTS (plain old telephone service). As shown, cable TV source location 10 has cable TV transmission equipment 12 which may originate from several sources including a satellite receiver 14. The TV equipment 12 would then amplify this signal and send it out typically on a coaxial line such as line 16 to a distribution system which may include several stations such as station 18 where the signal is again amplified and further distributed to an even larger multiplicity of locations. Such re-amplification and further distribution may occur several times but eventually will arrive at a local distribution terminal 20 by means of a coaxial cable 12a from which it is then distributed to a home or building 22 by a coaxial cable 12b. As shown distribution terminal 20 may also provide TV signals to other buildings or homes such as indicated by bracket 24. Once the TV signal is received at building 22, it will then typically be provided to a TV set 26 directly or to a set-top or cable TV box 28. If the signal is first provided to the set-top box 28, it is then directly provided to TV set 26. It should be appreciated that the direction of travel for such signals is primarily unidirectional and downstream. That is, it travels primarily from the cable TV signal source 10 to the set-top box 28 in the building or home 22 at frequencies within a frequency band of between 55-870 MHz, and which TV channels have frequencies of between 55-870 MHz.

Also shown is a typical telephone system or POTS which of course is two-way communication typically carried by means of a twisted pair of wires. In the example shown in FIG. 1, if someone at the cable TV signal source location 10 wishes to talk with someone at building 22, the telephone 30a is used in its normal manner. The two-way conversation is carried on between the person in building 10 using telephone 30a and by a person using telephone 30b in the home or building 22. This communication is typically carried through a pair of twisted wires such as indicated by 32, 32a, and 32b. In recent years, the regular telephone distribution system has also been used to provide communications between computers. This is done by the use of a modem 34 which connects a computer to the telephone line. As was the case with the TV signal distribution, there are typically several stations or substations such as substation 18a between the two telephones 30a and 30b located at the building 10 and the building 22, respectively. Such distribution terminals or stations allow telephone services between all subscribers with which we are all well aware. However, as shown in portion 20a of distribution terminal 20, there may also be several other buildings or homes connected to telephone distribution terminal 20 as indicated by bracket 24a. As was discussed earlier, communications between buildings 10 and 22 were typically accomplished through regular telephone service by individuals talking to each other. However with more efficient automation, telephone lines may also be connected up to the set-top box 28 as indicated by wires 36. In addition, in the distribution terminal 38 at the cable TV signal location, there is also a telephone connection to the TV signal equipment 12, such that it is now possible that movies or information concerning the TV signals and TV equipment can be communicated between the two locations.

Figure 2:
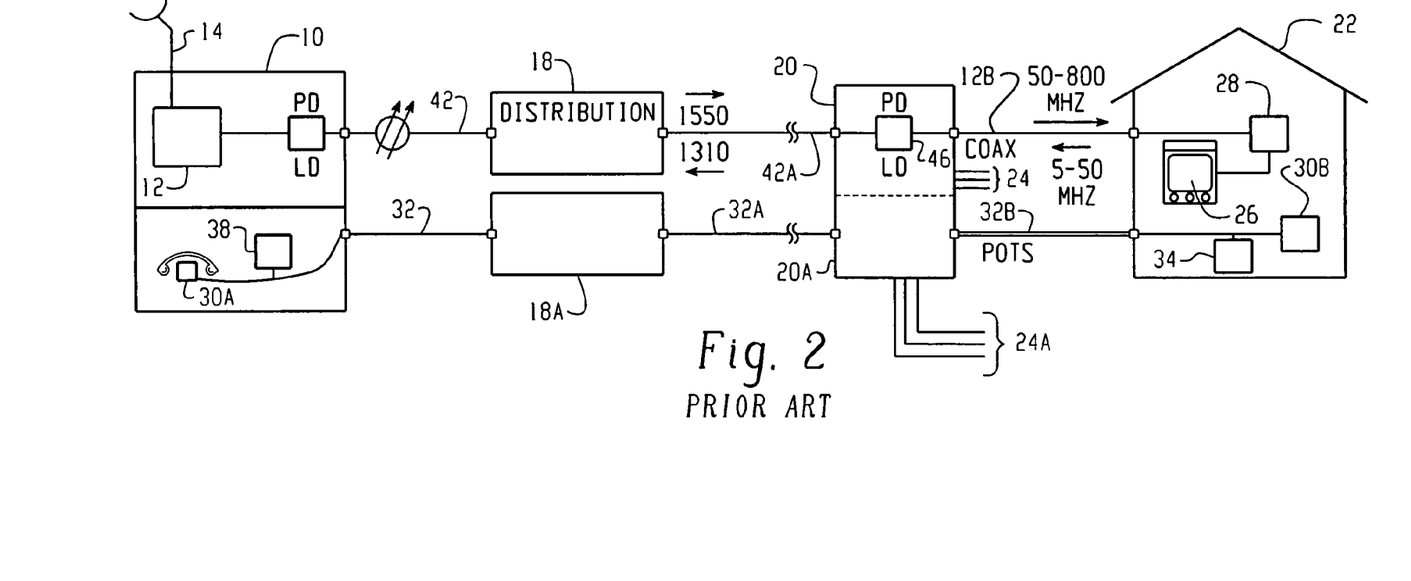
FIG. 2 shows a POTS telephone system and a fiber optic TV distribution system having 1550 nanometer light carrying TV signals in one direction and 1310 nanometers of light carrying telephony signals in both directions.

As demands increase for more and more TV channels and better and more efficient transmission techniques without disruption and interference, the long runs of coaxial cable are simply becoming inefficient and inadequate. Thus as is shown in FIG. 2, there is an improved system for the transmission of TV signals between the TV signal source location 10 and the building or home 22. In the systems shown in FIG. 2, there is also shown a standard telephone or POTS system as discussed above.

In the improved television transmission system, however, the transmission is achieved by a fiber optical cable as indicated by fiber optical cables 42 and 42a. As shown in FIG. 2, the same coaxial cable 12b exist between the distribution terminal 20 and the home of building 22. However, also as shown distribution terminal 20 includes new equipment 46 which receives the light transmitted on fiber optic 42 and converts it to electrical signals and conversely receives electrical signals from 12b and converts the electrical signals to light signals for transmission on fiber optic 42a. However as will be appreciated by those skilled in the art, the TV signals from the TV signal source building 10 normally travel downstream only and are continuous. Thus, it is seen that it is possible by the use of a single fiber optic cable as well as using existing infrastructure copper wiring such as coaxial cable to transmit a broad frequency band of TV signals carrying multiple channels of TV information at one wavelength of light. The individual TV channels are then converted to electrical signals at a specific frequency within a selected frequency band, such as for example, only the 55-870 MHz frequency band.

Figure 3:
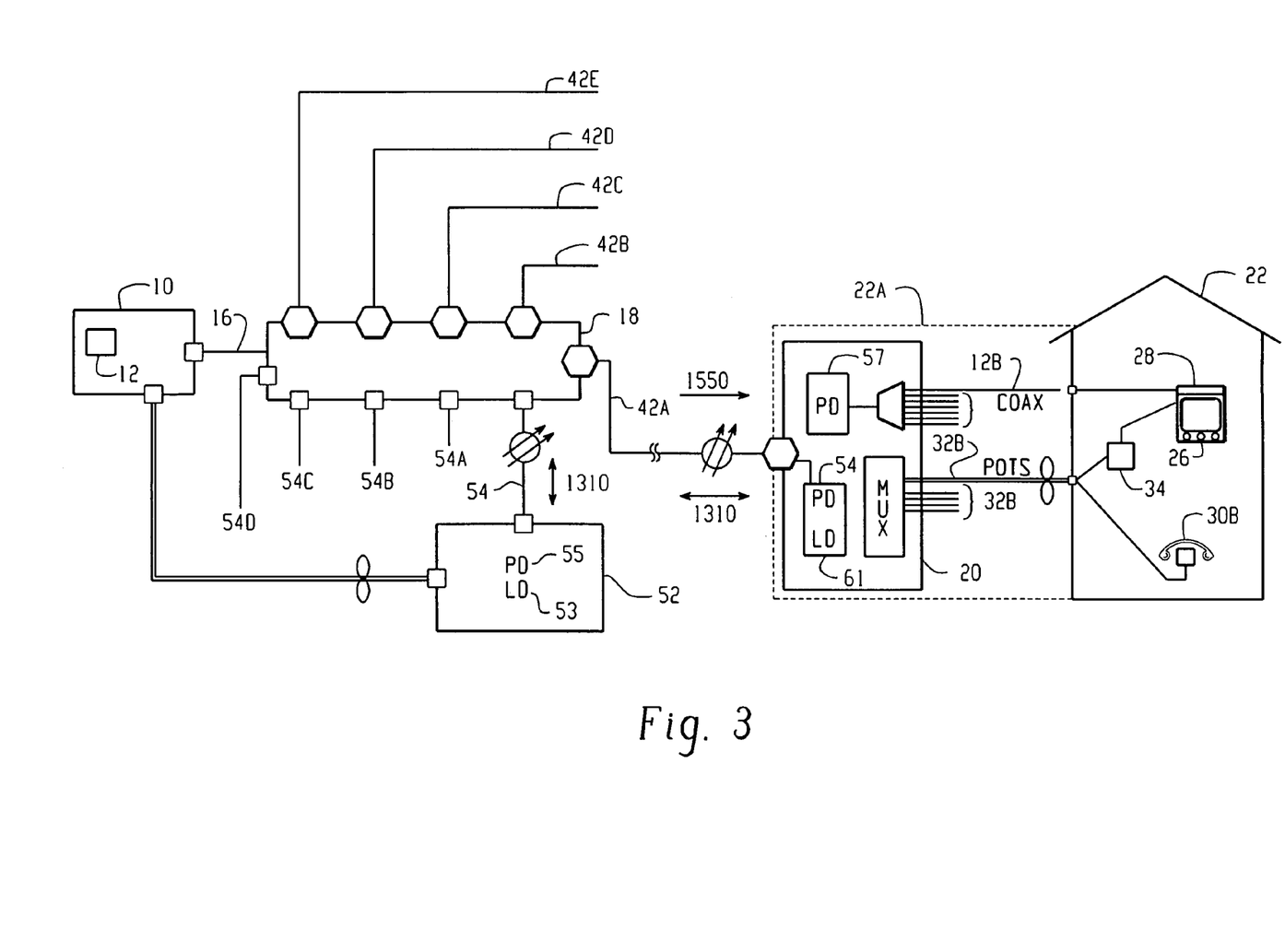
FIG. 3 shows a block diagram of a communication system using the present invention and which incorporates portions of the existing POTS telephone system and the coaxial TV signal distribution system while using a single optical fiber for carrying the TV signals at 1550 nanometers of light downstream and the telephony signals in both directions at 1310 nanometers.

Referring now to FIG. 3 there is shown a simplified block diagram of the operation of one embodiment of the present invention which takes partial advantage of the existing telephone and coaxial TV distribution systems while also using a single optical fiber 42a for part of the bidirectional telephone transmission (POTS) as well as part of the transmission path between the TV signal source location 10 and the building or home 22. It should be noted that, although the following discussion is in terms of a single direct path for the coaxial and optical fiber cable 42a between two locations 10 and 22, in actuality there will be a significant amount of multiplexing and de-multiplexing such that many, many subscribers or customers may be serviced by the single optical fiber and other multiplexed cables. It should also be noted that there may also be several amplification stations located at various locations in the distribution path.

Further, as is shown, in addition to the optical fiber 42A traveling between distribution terminal 18, hereinafter referred to as the ONU (Optical Network Unit) and a remote distribution terminal 20, hereinafter referred to as the HDT (Host Digital Terminal), there will be other optical fibers as indicated by optical fibers 42b through 42e which extend between distribution terminal or ONU 18 and other remote distribution terminals or HDT's (not shown) similar to HDT 20. Each of the optical fibers 42b through 42e will typically carry light at both 1550 nanometer and 1310 nanometer. As shown, TV signal source location 10 provides signals from equipment 12 and, in this illustrated embodiment, the TV signals may be 55-870 MHz signals provided on copper wire, such as coaxial cable 16. Copper coaxial cable 16 carries the TV signals having a band width of 55-870 MHz to an ONU 18 which uses the electrical TV signals to modulate light having a selected wavelength. In one preferred embodiment a particular selected wavelength is 1550 nanometers. Thus the light waves are provided to each of the individual optical fibers 42a-42e and travel in a single direction from ONU 18 to an equal number of remote terminals, such as HDT 20. Also as shown, electrical telephony signals may be carried by copper wires such as copper wires 48 which represent a twisted pair of normal telephone communication wires to a substation 52 where electrical telephony signals traveling downstream are used to modulate light at a selected frequency (typically by a laser diode—(LD) 53). In the same manner, light at that same frequency traveling upstream previously modulated by electrical telephony signals is processed to recover or detect (typically by a photo detector—(PD) 55) the telephony signals. Thus, the fiber optic cable 54 shown between ONU's 18 and substation 52 carries telephony signals at a single wavelength of light typically selected to be about 1310 nanometers. The light signals at 1310 nanometers are able to travel in both directions on the single fiber optic cable 54. Also as shown and as was discussed above with respect to optical fibers 42a through 42e, there will be a plurality of additional optical fibers 54a through 54d also carrying many other telephony signals at 1310 nanometers.

Thus, ONU 18 receives fiber optic cable 54 along with fiber optic cables 54a through 54d, each carrying the 1310 modulated light and also receives 55-870 MHz TV signals from the TV signal source location 10. The 55-870 MHz electrical signals are used to modulate light having a wavelength of 1550 nanometers. ONU 18 then combines by WDM (wave division multiplexing) the plurality of 1310 nanometer signals along with the 1550 nanometer signal such that cable 42a carries the TV signals in a downstream direction on 1550 nanometer light and carries bidirectional telephony signals in both directions on 1310 nanometer light. Of course, fiber optical cables 42b through 42e carry the 1550 nanometer light and the 1310 nanometer light in a similar manner.

At the remote downstream distribution terminals such as HDT 20, the bidirectional telephony signals traveling on 1310 nanometer light waves are routed to equipment in HDT 20 which recovers the electrical telephony signals by a photo detector—(PD) 59 from the 1310 nanometer light waves traveling downstream and uses the electrical telephony signals traveling upstream to modulate light waves having a wavelength of 1310 nanometers by laser diode—(LD) 61. The electrical telephony signals are then distributed from distribution box 20 by twisted wire pair 32b to the telephone 30b or other telephony equipment such as the 56K telephone modem 34 at home or building 22.

Figure 4:
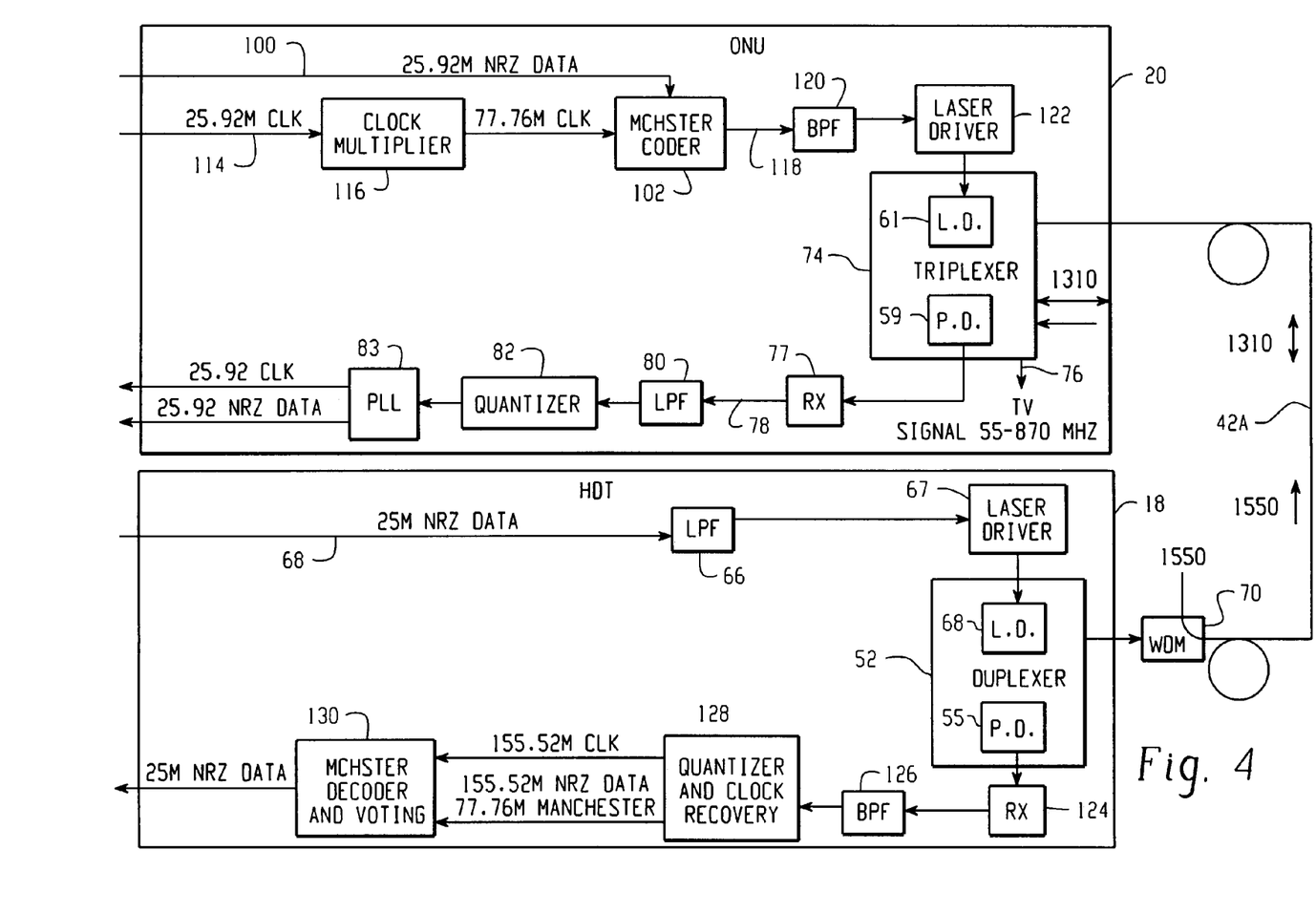
FIG. 4 shows a block diagram of the apparatus and data flow of the present invention.

As was discussed above, the extremely broad bandwidth available with the use of optical fibers as a transmission medium offers many advantages and vastly increased subscriber density on a single fiber. Unfortunately, new uses and demands continue to grow at ever increasing rates. Consequently, what may have appeared to be an over abundance of bandwidth for years to come is already or threatens to become crowded in the near future. In addition, every technology has its own special set of problems and the use of optical fiber as a transmission medium for telephony communication is no exception. More particularly, a light wave traveling through a fiber is particularly vulnerable to reflection if the connector joining the two fibers is dirty or improperly fitted. The present invention discloses transmission techniques or protocols to minimize the effects of reflection, loss of data bits and overlap of the transmitted energy spectrum. Referring now to FIG. 4, there is shown a block diagram illustrating the features of the present invention. It should be noted that elements of FIG. 4 which are common with the elements of FIG. 3 carry the same reference numbers. To aid in understanding of the invention, the following embodiment of the invention is described assuming a two-way communication exchange extending at least between a first location or HDT distribution terminal 18a and a second location or ONU-type distribution terminal 20.

According to the described embodiment, a first data stream of electrical pulses in NRZ (non-return to zero) format is transmitted to a low pass filter 66 located in HDT distribution terminal 18. In a preferred embodiment, the NRZ electrical pulses have a frequency of around 25 MHz. More specifically, using standard and readily-available components and parts this frequency will actually be about 25.92 MHz. Low pass filter 66 will typically be chosen so as to readily pass frequencies less than about 25 MHz, while substantially blocking all frequencies above about 30 MHz. The 25 MHz NRZ data stream is then provided through laser driver 67 to laser diode (LD) 68 in duplexer 52 for modulating light waves having a nominal wavelength of about 1310 nanometers. This modulated light at 1310 nanometers is injected or focused directly onto optical fiber 42a, or alternatively, as shown in FIG. 4, the modulated light may first be provided to WDM (wave division multiplexer) 70 which combines the modulated 1310 nanometer light with another light frequency (such as 1550 nanometer) from optical fiber 72.

The 1310 nanometer light carrying the NRZ data stream is then provided to triplexer 74 which separates out the 1550 nanometer light carrying the TV signals as shown at 76, and passes the 1310 nanometer light modulated by the NRZ data stream to photo diode 59. Photo diode 59 in triplexer 74 along with recovery circuit 77 recovers the 25 MHz NRZ data stream and provides this data stream on electrical conduit 78 to low pass filter 80 and then onto Quantizer 82. Quantizer 82 regenerates the 25 MHz NRZ data stream to increase the signal-to-noise ratio. The output of Quantizer 82 is then provided to PLL (phase lock loop circuit) 83 to recover the 25.92 NRZ data and the 25.92 clocking pulses. The 25 MHz NRZ data is then provided to receiving equipment.

The transmission path from second location or ONU 20 to HDT 18 in earlier optical transmission systems might well have been a mirror image of the transmission sequence from HDT 19 to ONU 20 as discussed above. However to assure transmission integrity, the present invention includes an NRZ transmission protocol in one direction as just discussed, and a Manchester code transmission protocol in the opposite direction.

Figure 5A:
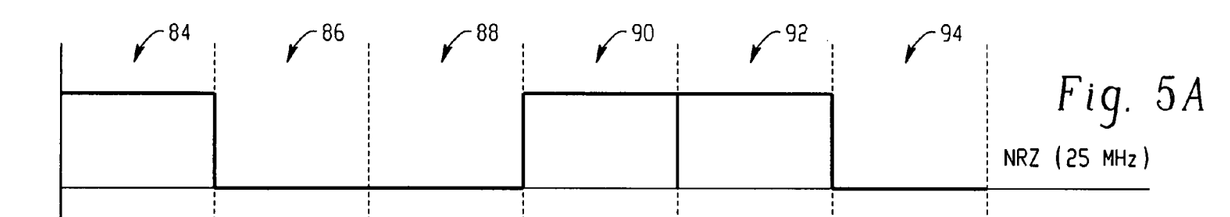
FIG. 5A shows an example of an NRZ (non-return to zero) data stream at 25 MHz and having a series of data bits 1, 0, 0, 1, 1 and 0.
Figure 5B:
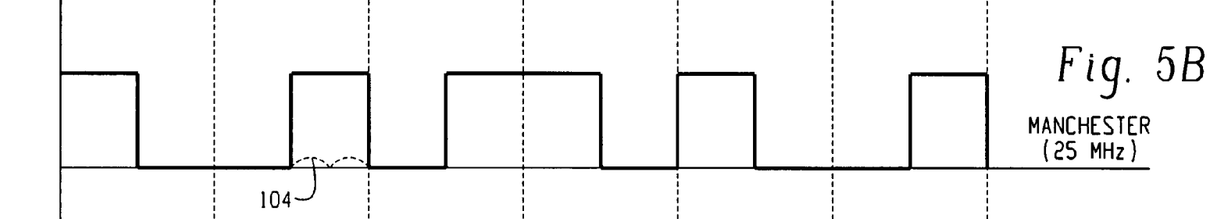
FIG. 5B shows the same series of data bits of FIG. 5A using Manchester coding at 25 MHz.

Referring now to FIG. 5A, there is shown an NRZ digital data stream having bits 84 through 94 which represent binary bits 1, 0, 0, 1, 1, and 0 respectively. Referring now to FIG. 5B, there is shown a typical Manchester code representing the same data stream of "1"'s and "0"'s as shown in the NRZ code of FIG. 5A. That is, FIG. 5A shows the NRZ code and FIG. 6B shows the Manchester code for the data sequence 1, 0, 0, 1, 1, 0. As is recognized by those skilled in the art, one advantage of Manchester code is the increase in signal transitions or leading and trailing edges.

Referring again to FIG. 4, the Manchester code protocol for data transmission from ONU 20 to HDT 18 will be discussed. As shown, an NRZ data stream is provided along an electrical conductor 100 to circuitry 102 which converts the NRZ coded data stream on line 100 to an equivalent Manchester coded data stream. It will be appreciated that coding circuitry 102 could simply convert the 25 MHz NRZ data stream to a 25 MHz Manchester coded data stream as shown in FIGS. 5A and 5B as was discussed above. However, significantly improved performance can be achieved by converting to a Manchester coded data stream which has a frequency which is a multiple of the frequency of the NRZ coded data stream.

Figure 5C:
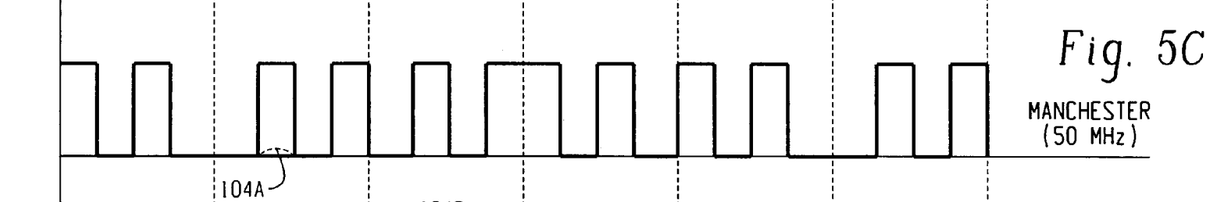
FIG. 5C shows the same series of data bits of FIG. 5A using Manchester coding at 50 MHz.
Figure 5D:
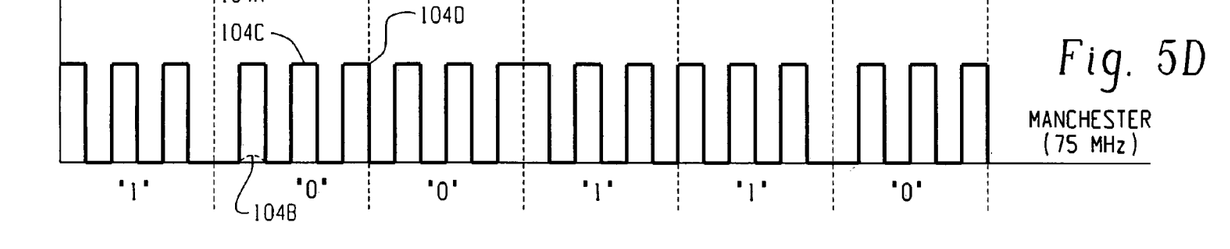
FIG. 5D shows the same series of data bits of FIG. 5A using Manchester coding at 75 MHz.
Figure 6:
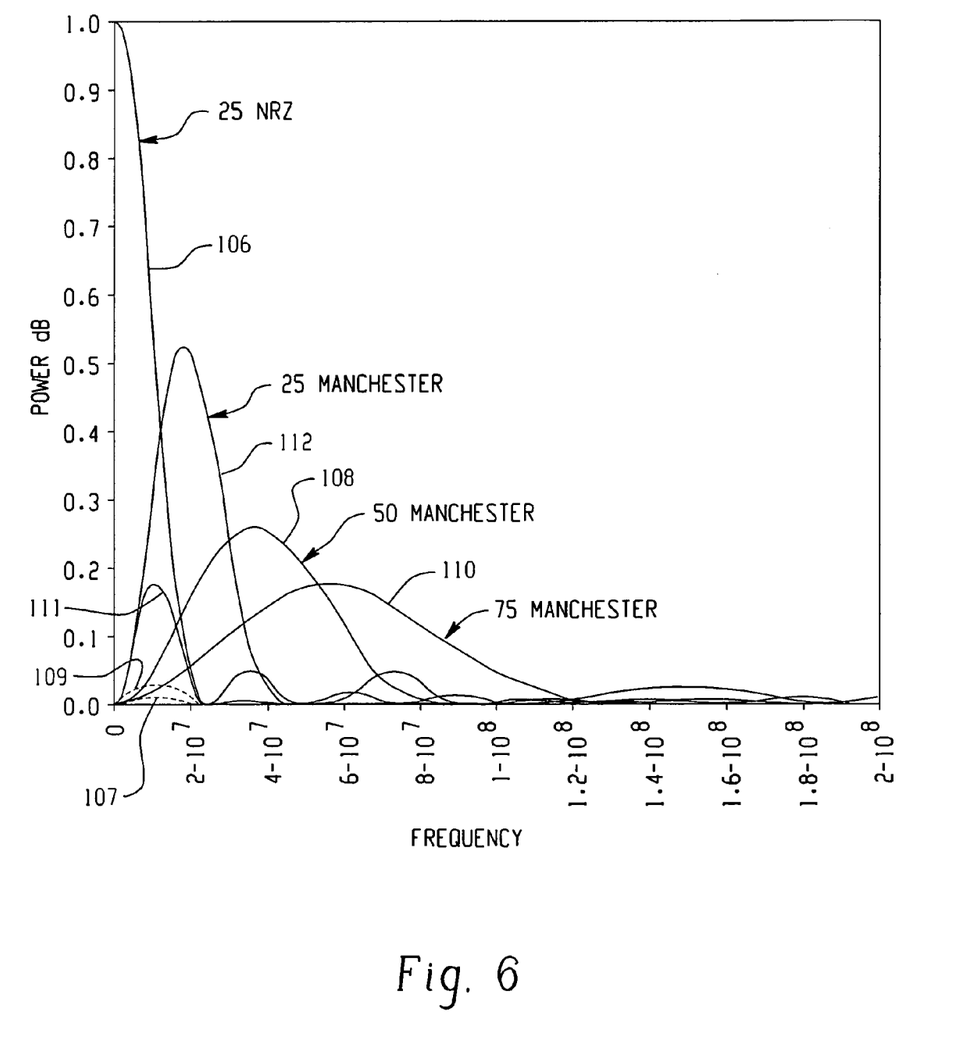
FIG. 6 illustrates the power spectrum in dB versus frequency for the coded data stream of FIGS. 5A through 5D.

Referring now to FIGS. 5C and 5D, there are shown Manchester coded data streams which are the equivalent of the 25 MHz NRZ data stream of FIG. 5A and the 25 MHz Manchester coded data stream of FIG. 5B. However, the Manchester coded data of FIG. 5C has a frequency two (2) times that of FIGS. 5A and 5B, and the Manchester coded data of FIG. 5D has a frequency three (3) times that of FIGS. 5A and 5B. More specifically, for every Manchester coded bit (84 through 94) shown in FIG. 5B, there are two Manchester coded bits in FIG. 5C and three Manchester coded bits in FIG. 5D. The substantially increased numbers of data bits and leading edge and trailing edge transitions of the data stream of FIG. 5D allows for "majority voting" to assure data integrity, and, as will be discussed later, greater isolation or separation of the signal power spectrum. For example, referring to the "0" data bit 86, if noise or interference corrupted the data pulse, such as shown by dotted line 104 in FIG. 5B, there would likely be a data error in the transmission. Also, if noise corrupted one of the data pulses representing data bit 76, as shown by dotted line 104a in FIG. 5C, there would be one correct data pulse and one corrupt data pulse. So, there may or may not be a data error in the transmission. However, if data pulse 104b of FIG. 5D is corrupted, there would still be two correct pulses such that a "majority voting" circuit could compare the corrupted data pulse 104b with the two equivalent uncorrupted pulses 104c and 104d. Since two of the three pulses (104c and 104d) indicate a "0" data bit and only the corrupted pulse 104a does not indicate a "0" data bit, the "majority voting" determines that the correct data bit is a "0". In addition, as shown in FIG. 6 the signal power spectrum of a Manchester coded signal is substantially separated from the 25 MHz NRZ coded signal power spectrum (reference number 106) when the frequency is two times (2×) or 50 MHz or three times (3×) or 75 MHz that of the 25 MHz NRZ signal as shown by reference numbers 108 and 110 respectively. There is some separation of the signal power spectrum between the 25 MHz NRZ coded signal (106) and the 25 MHz Manchester coded signal (112), but, as shown, the separation is better with the 50 MHz Manchester coded signal 108 and significantly better with the 75 MHz Manchester coded signal 110. Of course, the separation would be even greater if the frequency was multiplied four times (4×) or more. However, to minimize cost and necessary bandwidth, three times appears to be optimal. In addition, it should be noted that if the actual NRZ data rate is 25.92 MHz and the clock multiplier 116 is ×3, that is, the clock multiplier triples the 25.92 rate, the resulting Manchester code rate will actually be 77.6 MHz rather than 75 MHz. This 77.6 MHz Manchester code rate is particularly satisfactory, since a 77.6 Manchester code rate is directly equivalent to a 155.52 NRZ rate, as will be appreciated by those skilled in the art. A 155.52 MHz NRZ code is the OC3 or optical carrier 3 standard data rate. Using such a standard NRZ data rate has the further advantage of allowing the use of standard components and parts.

Also, as shown in FIG. 6, the amount of cross-talk between the 25 MHz NRZ coded signal and the 50 MHz and 75 MHz Manchester coded signal is substantially less (indicated by curves 107 and 109) than the cross-talk between the 25 MHz NRZ coded data and the 25 MHz Manchester coded data shown by curve 111.

Therefore, to achieve these advantages and as shown in FIG. 4, the 25.92 MHz clocking signal 114 is provided to a clock multiplier 116 which multiplies the clock frequency at least two times (2×) and preferably three times (3×). As shown in FIG. 4, the multiplied clock frequency is provided to the Manchester coding device 102 so as to produce a coded signal of the type shown in FIG. 5D. The coded signal is then provided from Manchester coder 102 by conductor 118 to Band Pass Filter (BPF) 120 and then through laser driver 122 to laser diode 61 to modulate light having a wavelength of 1310 nanometers. The 3× modulated coded signal then travels by optical fiber 42a to photo diode 55 located in duplexer 52 and to recovery circuitry 124 where it is stripped off of the 1310 nanometer light and provided to BPF 126 and Quantizer and clock recovery circuitry 128. The 75 (actually 77.76) MHz modulated code is then provided to decoder (and if desired, voting circuit) 130 where it is reconverted to a 25.92 MHz NRZ coded signal. Thus, there has been provided an inexpensive and simple method and apparatus for providing improved bidirectional telephony communication.

The corresponding structures, materials, acts, and equivalents of all means or step plus function elements in the claims below are intended to include any structure, material, or act for performing the function in combination with other claimed elements as specifically claimed.

We claim:

1. A method of transmitting bidirectional communication data over a single optical fiber comprising the steps of:
   transmitting a first NRZ data stream having a first clocking frequency from a first location to a second location by said optical fiber using a carrier having a selected wavelength of light;
   receiving said selected wavelength of light from said first location at said second location and recovering said NRZ data stream;
   receiving a second NRZ data stream having said first clocking frequency at said second location;
   converting said second NRZ data stream to a Manchester coded data stream at a second clocking frequency which is a selected multiple of said first clocking frequency;
   transmitting said Manchester coded data stream from said second location to said first location by said optical fiber at said selected wavelength of light;
   receiving said Manchester coded data stream at said first location; and
   converting said Manchester coded data stream to an NRZ data stream having said first frequency;
   wherein said second clocking frequency is three times (3×) said first clocking frequency, and said Manchester coded data stream includes three (3) pulses for each data bit and further comprising voting said three (3) pulses to determine at least two (2) equivalent pulses and providing an output NRZ data bit at said first frequency equivalent to said at least two (2) equivalent Manchester data bits.

2. The method of claim 1 wherein said first clocking frequency is about 25 MHZ.

3. The method of claim 1 and further including the step of filtering said first NRZ data stream with a low pass filter prior to said transmitting step.

4. Apparatus for transmitting bidirectional communication data over a single optical fiber comprising:
   a first data source for providing a first electrical digital data stream coded as an NRZ data stream and at a selected clocking pulse rate;

a first light generator at a first location for generating light at a selected wavelength, said light generator connected to said first data source for receiving said NRZ coded data stream and for modulating light generated by said first light generator with said NRZ coded data;

an optical fiber extending from said first location to a second location for transmitting bidirectional light there between;

a first light detection device at said second location for receiving said light modulated by said NRZ coded data stream and for recovering said NRZ coded electrical digital data stream;

a second data source for providing a second electrical digital data stream coded as an NRZ data stream at said selected clocking pulse rate;

a source for providing clocking pulses at said selected clocking pulse rate;

a clock multiplier for multiplying said selected clocking pulse rate at least three times (3×);

a Manchester coding device connected to said clock multiplier for receiving said NRZ coded data stream and for converting said NRZ coded data stream at said selected clocking pulse rate to a Manchester coded data stream having pulses at a clocking pulse rate at least three times (3×) said selected clocking pulse rate;

a second light generator at said second location for generating light at said selected wavelength, said second light generator connected for receiving said Manchester coded electrical digital data stream and for modulating light generated by said second light generator with said Manchester coded data stream;

a second light detection device at said first location for receiving said light modulated by said Manchester coded electrical digital data stream and for recovering said Manchester coded electrical digital data stream; and a Manchester decoding device for receiving said Manchester coded electrical digital data stream and converted said received data stream to an NRZ coded data stream at said selected clocking pulse rate;

wherein said Manchester coded data stream includes three (3) pulses for each data bit and the Manchester decoding device is adapted to vote said three (3) pulses to determine at least two (2) equivalent pulses and provide an output NRZ data bit at said selected clocking pulse rate equivalent to said at least two (2) equivalent Manchester data bits.

5. The apparatus of claim 4 and further including a first low pass filter between said first data source and said first generator and a second low pass filter located after said first light detection means.

6. The apparatus of claim 5 and further including a first band pass filter between said Manchester coding device and said second light generator and a second band pass filter between said second light detection device and said Manchester decoding device.

7. A method of bidirectional communication over a single optical fiber comprising the steps of:

transmitting over the optical fiber in a first direction first digital data in a first data code at a first clock frequency and at a first wavelength;

converting second digital data in the first data code to a second data code at a second clock frequency, the second clock frequency a multiple of the first clock frequency;

transmitting over the optical fiber in a second direction the second digital data in the second data code at the second clock frequency and at the first wavelength; and converting the second digital data from the second data code to the first data code by setting each bit of the second digital data in the first data code equal to a majority of corresponding bits of the second digital data in the second data code.

8. The method of claim 7, wherein:

the step transmitting over the optical fiber in a first direction first digital data in a first data code at a first clock frequency comprises the step of transmitting NRZ data; and the step of transmitting over the optical fiber in a second direction the second digital data in the second data code at the second clock frequency comprises the step of transmitting Manchester coded data.

9. The method of claim 8, wherein the second clock frequency is three times the first clock frequency, and the Manchester coded data includes three bits for each bit of second digital data in the first data code.

10. The method of claim 9, wherein the step of converting the second digital data from the second data code to the first data code by setting each bit of the second digital data in the first data code equal to a majority of corresponding bits of the second digital data in the second data code comprises the step of voting the three bits to determine at least two equivalent bits and providing an output NRZ data bit at the first clock frequency equivalent to the at least two equivalent bits.

11. A system for bidirectional communication over a single optical fiber comprising:

means for transmitting over the optical fiber in a first direction first digital data in a first data code at a first clock frequency and at a first wavelength;

means for converting second digital data in the first data code to a second data code at a second clock frequency, the second clock frequency a multiple of the first clock frequency;

means for transmitting over the optical fiber in a second direction the second digital data in the second data code at the second clock frequency and at the first wavelength; and means for converting the second digital data from the second data code to the first data code by setting each bit of the second digital data in the first data code equal to a majority of corresponding bits of the second digital data in the second data code.

12. A method of bidirectional communication over a single optical fiber comprising the steps of:

transmitting over the optical fiber in a first direction and at a first wavelength first digital data in a first data code;

converting second digital data in the first data code to a second data code so that the power spectrum of the second digital data in the second data code is substantially separated from the power spectrum of the first digital data in the first data code;

for each data bit of the second digital data in the first data code, including multiple corresponding data bits in the second digital data in the second data code;

transmitting over the optical fiber in a second direction and at the first wavelength the second digital data in the second data code; and converting the second digital data from the second data code to the first data code by setting each corresponding data bit of the second digital data in the first data code equal to a majority of equivalent bits in the multiple corresponding data bits in the second data code.

13. The method of claim 12, wherein:
the step transmitting over the optical fiber in a first direction first digital data in a first data code comprises the step of transmitting NRZ data at a first clock frequency; and
the step of transmitting over the optical fiber in a second direction the second digital data in the second data code comprises the step of transmitting Manchester coded data at a second clock frequency.

14. The method of claim 13, wherein the step of converting the second digital data from the second data code to the first data code by setting each corresponding data bit of the second digital data in the first data code equal to a majority of equivalent bits in the multiple corresponding data bits in the second data code comprises the step of the voting the three bits to determine at least two equivalent bits and providing an output NRZ data bit at the first clock frequency equivalent to the at least two equivalent bits.

15. A system for bidirectional communication over a single optical fiber comprising the steps of:
a first transmitter circuit configured to transmit over the optical fiber in a first direction and at a first wavelength first digital data in a first data code;
a first converting circuit configured to covert second digital data in the first data code to a second data code so that the power spectrum of the second digital data in the second data code is substantially separated from the first digital data in the first data code and to include multiple corresponding data bits in the second digital data in the second data code;
a second transmitter circuit configured to transmit over the optical fiber in a second direction and at the first wavelength the second digital data in the second data code; and
a receiver circuit configured to receive the second digital data in the second data code and convert the second digital data from the second data code to the first data code by setting each corresponding data bit of the second digital data in the first data code equal to a majority of equivalent bits in the multiple corresponding data bits in the second data code.

16. A method of transmitting bidirectional communication data over a single optical fiber comprising the steps of:
transmitting a first NRZ data stream having a first clocking frequency from a first location to a second location by said optical fiber using a carrier having a selected wavelength of light;
receiving said selected wavelength of light from said first location at said second location and recovering said NRZ data stream;
receiving a second NRZ data stream having said first clocking frequency at said second location;
converting said second NRZ data stream to a Manchester coded data stream at a second clocking frequency which is a selected multiple of said first clocking frequency;
transmitting said Manchester coded data stream from said second location to said first location by said optical fiber at said selected wavelength of light;
receiving said Manchester coded data stream at said first location; and
converting said Manchester coded data stream to an NRZ data stream having said first frequency.

* * * * *